July 21, 1931.  D. F. AINSLIE  1,815,539
PLOW ATTACHMENT
Filed Dec. 27, 1927
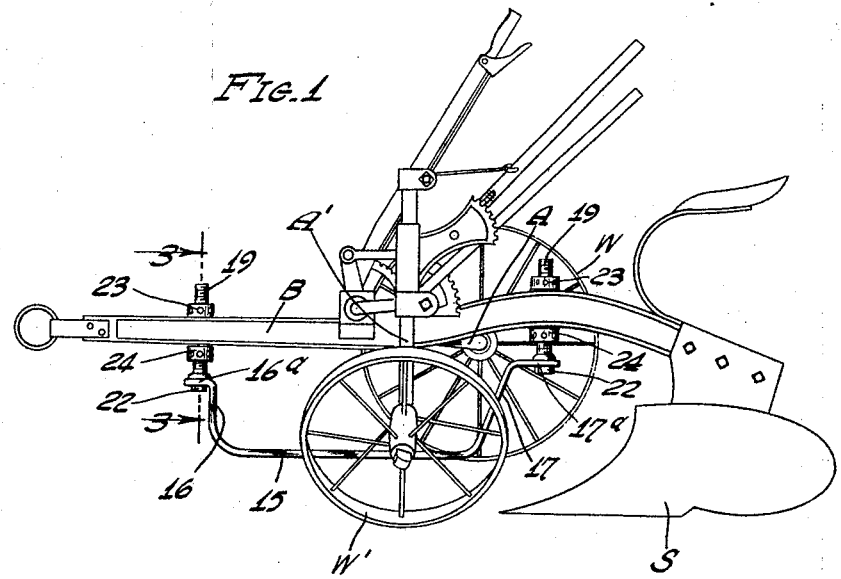
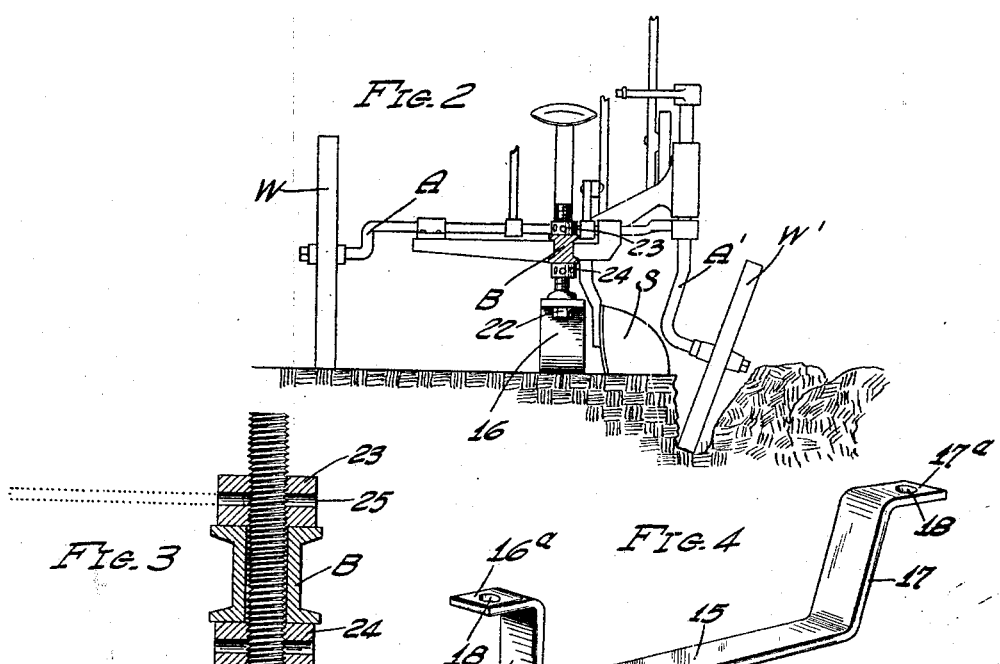
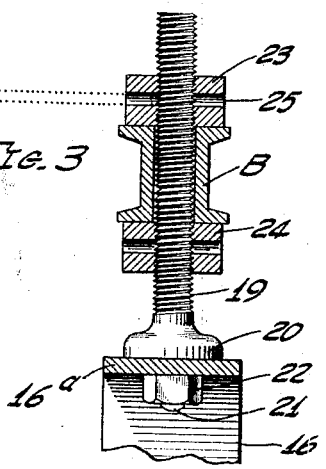
INVENTOR
DONALD F. AINSLIE
By Munn & Co.
ATTORNEY Patented July 21, 1931

1,815,539

UNITED STATES PATENT OFFICE

DONALD F. AINSLIE, OF BISHOP, CALIFORNIA

PLOW ATTACHMENT

Application filed December 27, 1927. Serial No. 242,830.

My invention relates to wheeled plows, walking, sulky, traction or otherwise, and it is a purpose of my invention to provide a simple and inexpensive attachment for wheeled plows by which the plowshare or shares is maintained at a uniform plowing depth irrespective of the consistency of the soil in order to anticipate the plow wheels sinking into spots or areas of relatively soft soil and thereby permitting the plowshare to drop below the prescribed depth at these spots or areas resulting in a furrow of uneven depth and a failure of the plowshare to turn the soil.

I will describe only one form of attachment for plows embodying my invention and will then point out the novel features in claim.

In the accompanying drawings:

Fig. 1 is a view showing in side elevation a plow having applied thereto one form of attachment embodying my invention;

Fig. 2 is a view showing the plow and attachment in front elevation, with the plow beam in section;

Fig. 3 is an enlarged vertical sectional view taken on the line 3—3 of Fig. 1 showing one form of fastening means embodying my invention, by which the attachment is adjustably secured to the plow; and Fig. 4 is a detail perspective view of the attachment.

In carrying out my invention, I have shown the attachment applied to a conventional form of wheeled plow including a beam B supported in elevated position on an axle A having a wheel W and a second axle A' having a furrow wheel W. At the rear end of the beam B is a conventional plowshare S.

I do not wish to be restricted or limited to the precise form of plow to which my attachment is applied, nor to the fact that I have shown my attachment applied to a plow, as it will be understood that the attachment is capable of being applied to any form of earth-working implement to function in maintaining the earth-working parts thereof at a uniform depth.

The attachment in its present embodiment comprises a substantially U-shaped body having a relatively wide and long base 15 and upwardly extending end portions 16 and 17, the free ends of which latter are bent outwardly to form angular extensions 16ª and 17ª, respectively, provided with openings 18 through which suitable fastening members are extended for securing the attachment as a unit to the plow. The body is shown as formed of a single length of strap metal or any other suitable material which will provide the requisite rigidity to prevent distortion when in use.

The fastening members for securing the attachment to the plow may be of any desired construction so long as they are capable of manipulation to effect a vertical adjustment of the attachment on the plow in order that the base portion 15 can assume any desired level in respect to the wheel W of the plow so as to maintain the plowshare S at a predetermined plowing depth. These fastening members each comprises a threaded shank 19 having a head 20 at its lower end provided with a threaded extension 21 to which is applied a nut 22, the extension 21 projecting through either opening 18 and the extension 16ª or 17ª secured on the extension by the application of the nut 22 thereto. The shank 19 is adapted to be extended through a suitable opening in the plow beam B, as illustrated to advantage in Fig. 3, and by the application of nuts 23 and 24 to the shank at opposite sides of the beam, the shank can be secured to the beam and yet adjustable therein vertically through the adjustment of the nuts 23 and 24. The nuts shown are formed with radial openings 25 into which any suitable instrument may be extended as illustrated in dash lines in Fig. 3 to facilitate rotation of the nuts as will be understood.

With the attachment applied to the plow, as illustrated in Figs. 1 and 2, its base 15 constitutes a runner and is adapted for sliding contact with the surface of the soil over which the plow moves. The attachment is spaced sufficiently from the wheel W so as to coact with the latter in supporting the plow in a fixed horizontal plane so that the plowshare S will be maintained at a uniform plowing depth and irrespective of the consistency of the soil.

In practice, the attachment is adjusted so that its base 15 is at or above the lowest point of the wheel W, depending upon what latitude of sinking movement of the wheel it is desired to permit as determined by a vertical adjustment of the attachment through manipulation of the fastening members. With the attachment adjusted to the position shown in Fig. 2 the runner 15 normally contacts with the surface of the soil and under forward movement of the plow it has sliding contact with the soil so as not to impede the movement of the plow. As long as the plow moves over relatively firm soil the wheels W and W' function to maintain the plowshare at the desired plowing depth. However, as the plow moves into relatively soft soil the wheel W tends to sink therein which, if permitted, would lower and forwardly tilt the plowshare thereby causing the latter to increase the depth of furrow and merely dig what may be termed a ditch, in that the plowshare would no longer function to turn the soil as required. However, with the attachment applied, any sinking tendency of the wheel W or the wheel W' is restrained by reason of the relatively long and broad supporting surface presented by the runner 15 which operates to prevent an appreciable sinking of the runner into the soil so that the latter serves to maintain the plow in the normal elevated position and, consequently, the plowshare is maintained at the previous plowing depth resulting in the formation of a furrow of uniform depth. In actual practice, relatively soft spots or areas of soil are encountered when plowing a field, and where the plow is not provided with the attachment it will naturally sink, thus deepening the furrow formed at this spot or area. By the provision of my attachment the plow is maintained at its normal digging level and, consequently, the furrow is not deepened at these soft spots or areas, but the normal depth of furrow is maintained.

Although I have herein shown and described only one form of attachment for plows embodying my invention, it is to be understood that various changes and modifications may be made herein without departing from the spirit of the invention and the spirit and scope of the appended claim.

I claim:

An attachment for earth-working implements, comprising a substantially U-shaped body having a relatively long and wide ground engaging base and lateral extremities, a pair of fastening members associated with the respective extremities of the body, each member comprising a screw-threaded shank rising from the respective extremity and provided at one end with an integral head abutting the upper side of the extremity, a threaded extension on the head and extending through the extremity with a nut on the lower end thereof for screwing the extension within the extremity and the shank against rotation, and a pair of nuts on the shank spaced apart to accommodate the beam of an earth working implement through which the shank is adapted to extend so as to secure the shank in the beam and yet permit vertical adjustment of the shank in the beam to vary the vertical position of the attachment on the implement.

Signed at Bishop, in the county of Inyo and State of California, this 5th day of December, 1927.

DONALD F. AINSLIE.